Nov. 12, 1968  T. J. MALOTT  3,410,295

REGULATING VALVE FOR METERING FLOW TO TWO HYDRAULIC CIRCUITS

Filed Feb. 21, 1966

INVENTOR
THOMAS J. MALOTT

BY Dodge and Sons

ATTORNEYS

United States Patent Office 3,410,295
Patented Nov. 12, 1968

3,410,295
REGULATING VALVE FOR METERING FLOW TO TWO HYDRAULIC CIRCUITS
Thomas J. Malott, Kalamazoo, Mich., assignor to General Signal Corporation, a corporation of New York
Filed Feb. 21, 1966, Ser. No. 528,700
5 Claims. (Cl. 137—114)

ABSTRACT OF THE DISCLOSURE

A hydraulic valve for combining the outputs of two pumps to provide a regulated supply rate to one utilization circuit and to provide an unregulated supply rate to a second such circuit. The valve includes a first flow path adapted to transmit continuously the output of one pump to the first utilization circuit, and a throttling valve adapted to receive the output of the second pump and to meter it in reverse senses to a pair of branch passages which lead, respectively, to the two circuits. A shuttle valve, which responds to the pressure drop across a pair of series-connected metering orifices in the first flow path, selectively connects one branch passage with the first path either at a point between the orifices or at a point upstream of both orifices. The throttling valve is operated by the differential between the pressures in said one branch and in the first flow path at a point downstream of both orifices.

---

This invention relates to flow regulating valves for use in hydraulic systems which employ a plurality of supply pumps and in which the output of one pump is delivered selectively to either or both of two demand circuits.

Systems of this kind are used today on construction vehicles, such as rubber tired articulated loaders, to supply fluid to the steering and implement circuits. Since the pumps used in these systems, usually are of the fixed displacement type and are driven by the propulsion engine of the vehicle, their discharge rates vary directly with engine speed. Because of this, and the fact that it is desirable to maintain the flow rate to the steering circuit substantially constant, the system commonly includes a flow regulating valve which automatically produces such a flow rate from the variable outputs of two pumps. In the usual case, the flow regulating valve transmits continuously to the steering circuit the full output of one pump, termed the steering pump, and a portion of the output of the second pump, termed the switch pump, which varies inversely with engine speed and which is sufficient to raise the total steering supply rate to the desired value. The excess output, if any, of the switch pump is diverted to the implement circuit.

My copending application, Ser. No. 338,176, filed Jan. 16, 1964, now Patent 3,289,688, granted Dec. 6, 1966, discloses a flow regulating valve of the general type just mentioned which uses the discharge rate of the steering pump as a measure of engine speed, and meters the output of the switch pump to the implement and steering circuits in accordance with variations in this quantity. The valve is characterized by a single spring biased valve spool which is actuated by the pressure differential created by a metering orifice in the flow path from the steering pump and which serves to vary in reverse senses the flow areas of a pair of throttling orifices interposed between the output connection of the switch pump and the input connections to the two demand circuits. At low and intermediate engine speeds, the flow path from the switch pump to the implement circuit is either closed or restricted and therefore the steering circuit receives fluid at the substantially constant rate required for optimum steering characteristics. On the other hand, at the high engine speeds at which the implement does most of its work, and the pressure losses which accompany fluid throttling could constitute a serious power drain and cause overheating of the oil, the throttling orifice in the flow path to the implement circuit is opened fully and the total output of the switch pump is delivered to that circuit.

Although the valve just mentioned is the best prior regulating valve of which I am aware, even this design has disadvantages. One of its drawbacks stems from the fact that the metering orifice in the primary flow path from the steering pump has a variable flow area and is defined by cooperating portions of the valve spool and the wall of the valve bore in which it reciprocates. The shapes and dimensions of these cooperating portions are very difficult to calculate and, in most cases, would be selected by a trial and error technique. This increases the expense of matching the switching speed of the valve, i.e., the speed at which the full output of the switch pump is diverted to the implement circuit, and the magnitude of the regulated steering supply rate to the requirements of a particular installation. A second, and less important disadvantage of the prior design, is that, when the valve is metering fluid from the switch pump to both demand circuits, the ratio of the two flows will change somewhat as a result of variations in the load pressures in the circuits.

The object of the present invention is to provide an improved flow regulating valve which is no more difficult or expensive to construct than the prior design mentioned above, but whose flow splitting action is insensitive to load pressure variations in the two demand circuits and whose operating characteristics can be changed easily to match the requirements of a particular user. The new valve is characterized by a throttling or flow splitting element which responds solely to the rate of flow in the steering supply path, and by the use of simple thin-plate or sharp-edged orificies to determine both the switching speed and the magnitude of the regulated steering supply rate.

The preferred embodiment of the invention is described herein in detail with reference to the accompanying drawing in which.

Figure 1:
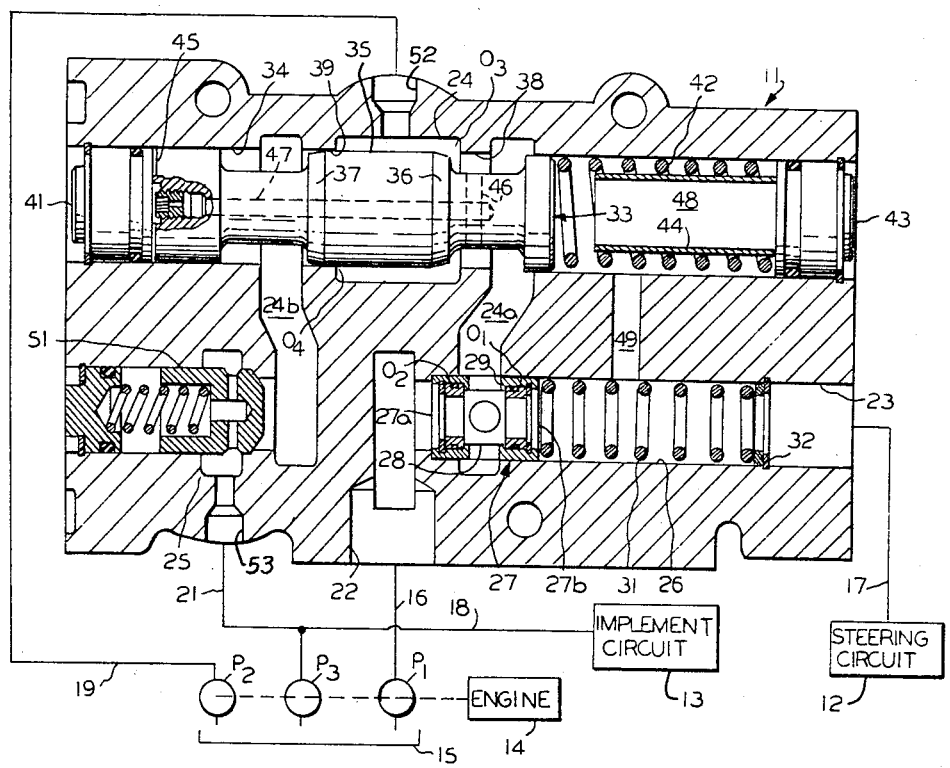
FIG. 1 is a sectional view of the improved valve showing, in schematic form, one system in which it can be used.

As shown in FIG. 1, the improved regulating valve 11 is embodied in an integrated steering and implement system of the type described and claimed in my copending application Ser. No. 520,536, filed Jan. 13, 1966, now Patent 3,355,994, granted Dec. 5, 1967, and which serves to supply fluid to the steering and implement circuits represented at 12 and 13, respectively. The system includes three fixed displacement pumps $P_1$, $P_2$ and $P_3$, normally of the gear type, which are driven by the propulsion engine 14 and which draw fluid from a common reservoir 15. The output of pump $P_1$ is delivered continuously to the steering circuit 12 through conduits 16 and 17 and the flow regulating valve 11, and the output of pump $P_3$ is delivered continuously to the implement circuit 13 through conduit 18. The switch pump $P_2$, on the other hand, is connected with the regulating valve 11 through conduit 19 and, depending upon the speed of engine 14, its output is delivered to either or both of the demand circuits 12 and 13 through conduit 17 or through conduits 21 and 18.

The flow regulating valve 11 comprises a housing containing primary inlet and outlet ports 22 and 23 which are connected with the conduits 16 and 17, respectively, and secondary inlet and outlet ports 52 and 53 which communicate with cored chambers 24 and 25 and are connected with the conduits 19 and 21, respectively. The primary ports 22 and 23 are interconnected by a valve bore 26 which is intersected by a cored passage 24a and which contains a reciprocable shuttle valve 27. Extending through valve 27 is an axial bore 28 which is intersected by a plurality of radial passages 29 and in which are mounted a pair of sharp-edged orifice elements $O_1$ and $O_2$. These elements $O_1$ and $O_2$, which are held in place by snap rings, are positioned at opposite sides of the radial passages 29, and it will be understood that the flow area of orifice $O_1$ is small in relation to the total flow area of these passages. Shuttle valve 27 is biased to the left to the illustrated low speed position, which is defined by a step in bore 26 and in which radial passages 29 register with cored passage 24a, by a coil compression spring 31 which is seated on a washer supported by snap ring 32. The valve 27 is shifted to the right to the high speed position by the pressure differential across orifices $O_1$ and $O_2$; the upstream pressure acting on end face 27a and the downstream pressure acting on end face 27b. In the high speed position, cored passage 24a communicates with bore 26 across the left edge of valve 27 and at a point upstream of orifice $O_2$.

Cored passage 24a, and the companion cored passage 24b which leads to secondary outlet chamber 25, constitute two parallel-connected outlet branches for the fluid supplied to secondary inlet chamber 24. Flow from chamber 24 is controlled by a spool valve 33 which reciprocates in a through valve bore 34, and which is formed with a central land 35 whose tapered ends 36 and 37 cooperate with the fixed lands 38 and 39 of bore 34 to define a pair of throttling orifices $O_3$ and $O_4$. Valve spool 33 is biased to the left to a position in which it contacts plug 41, and in which orifices $O_3$ and $O_4$ are fully open and closed, respectively, by a coil compression spring 42 which is seated on closure plug 43 and supported internally by a sleeve 44 fixed to that plug. Spool 33 is shifted to the right, to progressively close orifice $O_3$ and open orifice $O_4$, by the pressure differential across orifice $O_1$; the upstream pressure being transmitted to the chamber 45 via radial passages 29, cored passage 24a, radial passages 46 and axial passage 47 and acting on the left end of spool 33, and the downstream pressure being transmitted to chamber 48 via passage 49 and acting on the right end of the spool.

As a safety precaution, a check valve 51 is inserted in the connection between cored passage 24b and secondary outlet chamber 25. This valve prevents bleed off of the pressure in the implement circuit in the event a major leak develops in steering circuit 12 or in one of the components or passages with which it is in direct communication.

Figure 2:
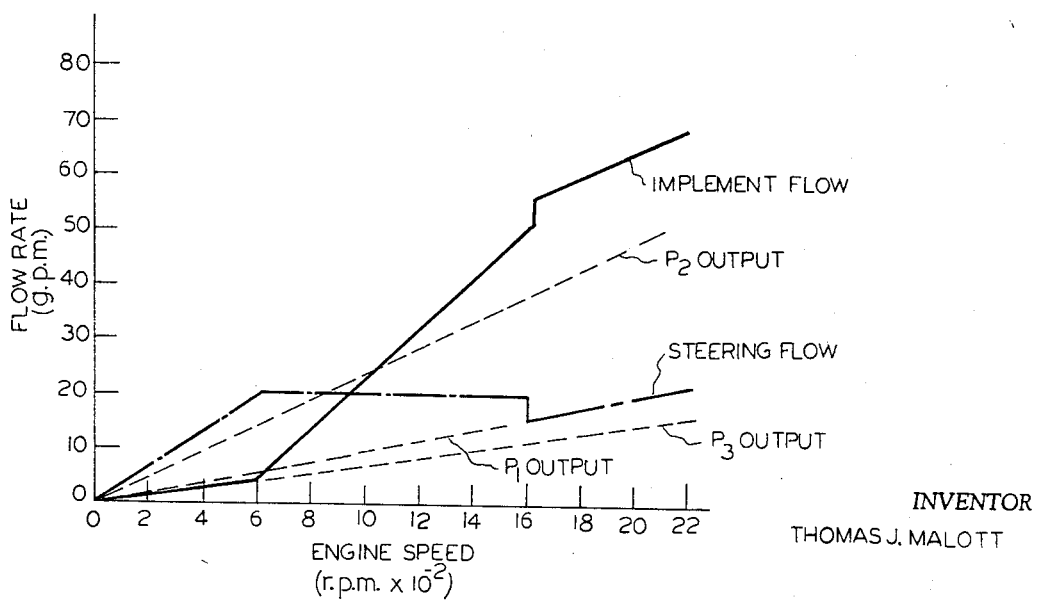
FIG. 2 is a graph illustrating the operating characteristics of a typical system.

For purposes of the following description of operation, it is assumed that the illustrated system is used on a rubber tired articulated loader whose engine 14 is equipped with a torque converter, that the minimum (i.e., low idle) and maximum (i.e., high idle) speeds of the engine are 600 and 2200 r.p.m., respectively, that the implement circuit does most of its work at speeds above 1800 r.p.m., that the steering circuit is designed for a flow rate of 20 g.p.m., and that the delivery rates of pumps $P_1$, $P_2$ and $P_3$ are those shown in FIG. 2. Since it is essential, from the standpoint of minimizing heat losses and power drain, that all throttling of the output of pump $P_2$ be terminated before the engine speed reaches 1800 r.p.m., the switching speed of valve 11 must be safely below this value. A suitable switching speed is 1600 r.p.m.

When engine 14 is running, the full output of pump $P_3$ always is delivered to the implement circuit 13 via conduit 18, and the full output of pump $P_1$ always is delivered to the steering circuit 12 via conduit 16, primary inlet port 22, axial bore 28, orifices $O_2$ and $O_1$, valve bore 26, primary outlet port 23, and conduit 17. The output of pump $P_2$, on the other hand, is delivered to secondary inlet chamber 24 through conduit 19 and then, depending upon the speed of engine 14, to either or both of the cored passages 24a and 24b. At speeds below 600 r.p.m., the combined output of pumps $P_1$ and $P_2$ is less than the desired steering flow rate of 20 g.p.m., and therefore spring 42 maintains valve spool 33 in its illustrated position wherein orifice $O_4$ is closed and orifice $O_3$ is fully open. Under this condition, the full output of pump $P_2$ is directed through orifice $O_3$, cored passage 24a, and radial passages 29 into the axial bore 28 in shuttle valve 27, where it joins the flow from pump $P_1$ and is passed to the steering circuit through orifice $O_1$.

The oil passing through orifice $O_1$ creates a pressure differential which varies with the rate of flow to the steering circuit and which is applied to the opposite ends of valve spool 33. When the combined output of pumps $P_1$ and $P_2$ equals the desired steering flow rate of 20 g.p.m., and in the illustrated example this occurs at an engine speed of 600 r.p.m., the shifting force developed on spool 33 by this differential will just balance the preload in spring 42. Therefore, as the engine accelerates from this speed, and consequently the outputs of the pumps increase, the pressure force will shift valve spool 33 to the right to thereby progressively open orifice $O_4$ and progressively close orifice $O_3$. Now, some of the fluid delivered by switch pump $P_2$ is diverted to the implement circuit 13 through orifice $O_4$, cored passage 24b, check valve 51, secondary outlet chamber 25, and conduits 21 and 18. The amount of fluid which follows this parallel outlet path depends upon the ratio of the flow area of orifice $O_4$ to the flow area of orifice $O_3$. Since this ratio increases as the pressure differential across orifice $O_1$ tends to increase, it should be evident that valve spool 33 will maintain that differential, and consequently the flow rate to the steering circuit 12, substantially constant.

At speeds below the switching speed of 1600 r.p.m., the pressure differential across the two series-connected orifices $O_2$ and $O_1$ is insufficient to shift shuttle valve 27 to its high speed position against the opposing bias of spring 31. Therefore, in the low and intermediate speed ranges, throttling spool 33 is controlled exclusively by orifice $O_1$. However, when engine 14 reaches the switching speed of valve 11, shuttle valve 27 moves to the high speed position and connects cored passage 24a with bore 26 at a point upstream of orifice $O_2$. Now, valve spool 33 is subjected to the greater pressure differential developed by the two orifices $O_2$ and $O_1$ acting in series. As a result, the valve spool moves to the right to completely close throttling orifice $O_3$, and to fully open orifice $O_4$. Inasmuch as the differential which shifted shuttle valve 27 to its high speed position was developed solely by the flow from steering pump $P_1$, the interruption of all flow from pump $P_2$ to the steering circuit does not cause the shuttle valve 27 to return to its low speed position. Full opening of orifice $O_4$ allows the output of pump $P_2$ to be delivered to implement circuit 13 through a substantially unrestricted flow path and thereby minimizes pressure losses in the regulating valve. This conserves energy and precludes overheating of the hydraulic fluid.

As long as the engine speed is above 1600 r.p.m., the output of pump $P_1$ is great enough to create a pressure differential across orifices $O_2$ and $O_1$ which will maintain valve spool 33 in its extreme rightward position. Therefore, at these high speeds, implement circuit 13 will receive the maximum rate of supply.

When the engine speed decreases below 1600 r.p.m., spring 31 will move shuttle valve 27 back toward the illustrated low speed position wherein core passage 24a communicates with bore 26 exclusively through radial passages 29. At this time orifice $O_1$ again becomes the controlling orifice for valve spool 33, and consequently the pressure force acting on this member decreases. As a result, spring 42 will shift valve spool 33 to the left so that it commences to open orifice $O_3$ and close orifice $O_4$. Some of the fluid delivered to chamber 24 by pump $P_2$ now is again directed to steering circuit 12 through orifice $O_3$, cored passage 24a and radial passages 29. The proportion of the secondary flow which is supplied to the steering circuit will increase as the engine 14 decelerates in order to maintain the total steering flow rate at approximately 20 g.p.m. When engine speed reaches 600 r.p.m., valve spool 33 will have completely closed orifice $O_4$, and the full output of pump $P_2$ will be passing to the steering circuit.

Although, in the illustrated example, the output of pump $P_1$ at switching speed is less than the desired steering flow rate of 20 g.p.m., and therefore there is a sudden drop in the steering supply rate when the engine reaches this speed, this does not adversely affect the steering characteristics of the vehicle. This is so because the decrease in supply rate is not great and its occurs at a speed at which the steering flow demands are usually small, for example, on the order of a few gallons per minute.

A consideration of the operation of valve 11 will reveal that the magnitude of the regulated substantially constant rate of supply to the steering circuit depends upon the flow area of orifice $O_1$, the areas of the end faces of spool 33, and the force characteristics of spring 42. This supply rate can be changed easily by merely replacing orifice $O_1$ with another element having a different flow area. It also should be apparent that, for any size of orifice $O_1$, the switching speed of valve 11 depends entirely upon the flow area of orifice $O_2$, the areas of the end faces 27a and 27b of shuttle valve 27, and the force characteristics of spring 31. This speed setting can be varied, without the necessity for changing the size of pump $P_1$, by merely changing the size of the orifice $O_2$. Since both of the metering orifices $O_1$ and $O_2$ are of the thin-plate type, and their characteristics can be determined by calculation, it is evident that it is an easy matter to match the switching speed and the controlled output of valve 11 to the requirements of a particular installation.

It also should be observed that when spool 33 is in a metering position, i.e., when both of the orifices $O_3$ and $O_4$ are partially open, the controlled flow rate to steering circuit 12 will not be affected to any appreciable extent by variations in the load pressures in the steering and implement circuits. This is attributable to the fact that spool 33 responds exclusively to the pressure drop across orifice $O_1$. If changes in the loading on the two demand circuits causes the pressure in circuit 12 to rise relatively to the pressure in circuit 13, the proportion of the output of pump $P_2$ which leaves chamber 24 via orifice $O_4$ will tend to increase. However, since an increase in the flow through orifice $O_4$ is accompanied by a decrease in the flow through orifice $O_3$, and consequently by a decrease in the total flow through orifice $O_1$, the pressure differential acting on spool 33 will decrease. As a result, spring 42 will shift valve spool 33 to the left to increase and decrease the flow areas of orifices $O_3$ and $O_4$, respectively, and thus restore the flow rate through orifice $O_1$ to the desired value. On the other hand, if the loads on circuits 12 and 13 change in such a way as to cause the pressure in implement circuit 13 to rise relatively to the pressure in steering circuit 12, the flow through orifices $O_3$ and $O_1$ will tend to rise. In this case, the differential acting on valve spool 33 will increase and shift valve spool 33 to the right against the bias of spring 42. This action will increase and decrease the flow areas of orifices $O_4$ and $O_3$, respectively, and thereby restore the steering flow rate to the set value.

As stated previously, the drawing and description relate only to the preferred embodiment of the invention. Since changes can be made in the structure of this embodiment without departing from the inventive concept, the following claims should provide the sole measure of the scope of the invention.

What I claim is:
1. In combination
   (a) means defining a first flow path having inlet and outlet portions, and a connecting portion which contains a pair of metering orifices in series flow relation;
   (b) means defining a second flow path having a common inlet portion and first and second outlet branches connected in parallel flow relation;
   (c) means, including a shuttle valve, for interconnecting the first outlet branch and the first flow path, said shuttle valve being shiftable between a first position in which it connects the first outlet branch with the first flow path at a point intermediate the two metering orifices, and a second position in which it connects the first outlet branch with the first flow path at a point upstream of both orifices;
   (d) first actuating means responsive to the pressure differential across both orifices for positioning the shuttle valve in said first and second positions, respectively, when the differential is below and above a predetermined value;
   (e) a throttling valve providing first and second flow control orifices interposed between the common portion and the first outlet branch and between the common portion and the second outlet branch, respectively, said throttling valve serving to vary the flow areas of said flow control orifices in reverse senses as it moves in opposite directions from an intermediate position; and
   (f) second actuating means responsive to the differential between the pressures in the first outlet branch and in the outlet portion of the first flow path for shifting the throttling valve in a direction to decrease the flow area of the first flow control orifice as the pressure differential increases and in the opposite direction as the pressure differential decreases.
2. The combination defined in claim 1 wherein
   (a) the shuttle valve comprises
       (1) a valve bore which constitutes the connecting portion of the first flow path and which is intersected intermediate its ends by said first outlet branch of the second flow path,
       (2) a valve member reciprocable in the bore between said first and second positions in which, respectively, it prevents and permits direct communication between the first outlet branch and the interior of the bore,
       (3) a longitudinal passage extending through the valve member and containing said two metering orifices, and
       (4) a transverse passage formed in the valve member and intersecting said longitudinal passage at a point between said metering orifices, said transverse passage registering with the first outlet branch when the valve member is in said first position; and
   (b) the first actuating means comprises a spring which biases the valve member toward the end of the bore communicating with the inlet portion of the first flow path, and the opposite transverse end faces of the valve member.
3. The combination defined in claim 2 in which the metering orifices are sharp-edged orifices.
4. The combination defined in claim 3 wherein
   (a) the throttling valve comprises
       (1) a valve bore intersected by three longitudinally spaced passages, the intermediate passage defining the common inlet portion of the second flow path and the other two passages defining the two outlet branches, and
       (2) a valve spool reciprocable in the bore and having a land whose opposite ends cooperate with the wall of the bore to define said two flow control orifices; and
   (b) the second actuating means comprises

(1) the transverse end faces of the valve spool,
(2) means for subjecting one of said end faces to the pressure in the first outlet branch;
(3) means for subjecting the other end face to the pressure in the outlet portion of the first flow path, and
(4) a spring for biasing the spool in the same direction as it is urged by the pressure in the outlet portion of the first flow path.

5. The combination defined in claim 4 wherein all of the parts are mounted within a single housing provided with a pair of ports at the opposite ends of the first flow path, a third port communicating with the common portion of the second flow path, and a fourth port communicating with the second outlet branch.

References Cited

UNITED STATES PATENTS

| | | | |
|---|---|---|---|
| 2,632,459 | 3/1953 | Yingst | 137—114 X |
| 2,905,191 | 9/1959 | Vander Kaay | 137—117 |
| 2,944,597 | 7/1960 | Wilson | 137—114 X |

WILLIAM F. O'DEA, *Primary Examiner.*

D. J. ZOBKIW, *Assistant Examiner.*